June 10, 1941.   J. R. DOSTAL   2,245,263
BOTTLE CARRIER
Filed Oct. 26, 1939   2 Sheets-Sheet 1

Inventor
J. R. Dostal
By
Attorneys

June 10, 1941.  J. R. DOSTAL  2,245,263
BOTTLE CARRIER
Filed Oct. 26, 1939  2 Sheets-Sheet 2

Inventor
J. R. Dostal

Attorneys

Patented June 10, 1941

2,245,263

UNITED STATES PATENT OFFICE 2,245,263

BOTTLE CARRIER

John R. Dostal, Milwaukee, Wis., assignor, by direct and mesne assignments, to Sturdy-Bilt Equipment Corporation, Milwaukee, Wis.

Application October 26, 1939, Serial No. 301,409

8 Claims. (Cl. 198—131)

This invention pertains to bottle conveyors, and more particularly to an endless carrier employed in bottle washing machines.

The invention has primarily for its object to improve bottle conveyors such as disclosed in United States Letters Patent No. 2,094,398, by materially simplifying and reducing the cost of manufacture, and increasing the effectiveness of the bottle locking mechanism without mutilation or damage to the bottles.

Incidental to the foregoing, a more specific object of the invention resides in the provision of an endless carrier for bottle washing machines comprising transverse flights for reception of the bottles, and opposed complementary locking bars slidably mounted on the flights for both longitudinal and transverse movement, to effect locking and releasing of the bottle necks.

A still further object is to provide a bottle locking mechanism, in which the opposed operative edges of the complementary shiftable bars are straight and parallel, thus eliminating expensive machining operations required in notching or keyhole slotting of the bars as shown in the Letters Patent referred to.

Another object resides in the provision of cam means on the flights for transversely shifting the opposed bars during their longitudinal movement.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings are illustrated one complete example of the phyisical embodiment of the present invention constructed according to the best mode so far devised for the practical application of the principles thereof.

Figure 1:
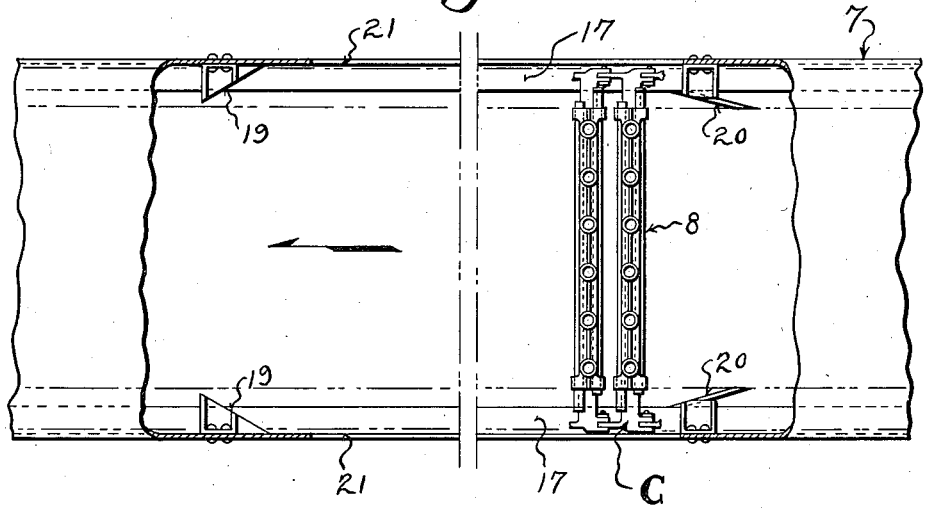
Figure 1 is a fragmentary plan view of a conventional bottle washer equipped with the present invention, parts being broken away and in section to more clearly illustrate structural details.

Referring now more particularly to the accompanying drawings, in that form of the invention illustrated in Figures 1 to 4 inclusive, the numeral 7 designates the casing of a conventional washing machine through which an endless bottle carrier C travels and subjects the bottles to sprays of cleansing fluid, and submerges the same in a soaking and rinsing bath.

The carrier C is of the general type disclosed in Letters Patent 2,094,398, comprising a plurality of flights pivotally connected at their ends to form a link conveyor. Each flight consists of alined upper and lower sections 9 and 10, respectively, which are spaced apart by depending feet 11 formed on the longitudinal edges of the upper section 9, and seated upon protuberances 12 formed on the lower section 10. Bolts 18 passing through the lower section, and threaded into the upper section, serve to secure the same in assembled position, and also act as guides for the locking bars, as hereinafter described. Obviously, the flights may be cast or formed in one piece without affecting the principles of the invention.

Figure 4:
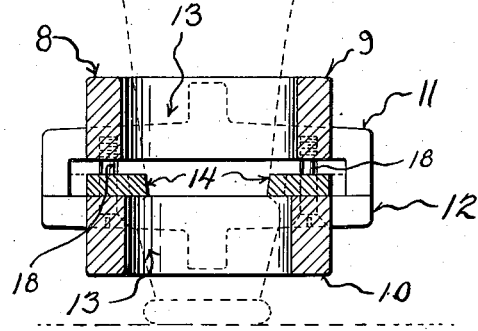
Figure 4 is an enlarged transverse section taken on the line 4—4 of Figure 3.

Both the upper and lower sections 9 and 10 are provided with alined spaced openings 13, which form pockets for the reception of the bottle necks, as indicated in dotted lines in Figure 4. Reciprocatively mounted on each of the flights between the spaced sections 9 and 10 opposed complementary locking bars 14, provided at their opposite ends with offset slots 15 for reception of the bolts 18, which serve to guide the bars and impart transverse movement thereto upon longitudinal reciprocation of the bars as hereinafter described. One end of each bar terminates in a vertical finger 16 disposed at the opposite side of the flight with relation to that of the adjacent bar.

As best shown in Figure 1, the pivotally connected ends of the flights 8 travel upon tracks 17 secured to the side walls of the casing 7, and for the purpose of reciprocating the locking bars 14, spaced cams 19 and 20 are attached to the side walls of the casing 7 in the path of travel of the vertical fingers 16. The cams 19 and 20 are positioned upon opposite sides of an opening 21 provided in the casing 7, in which space the operator both loads and removes bottles from the carrier C.

Figure 2:
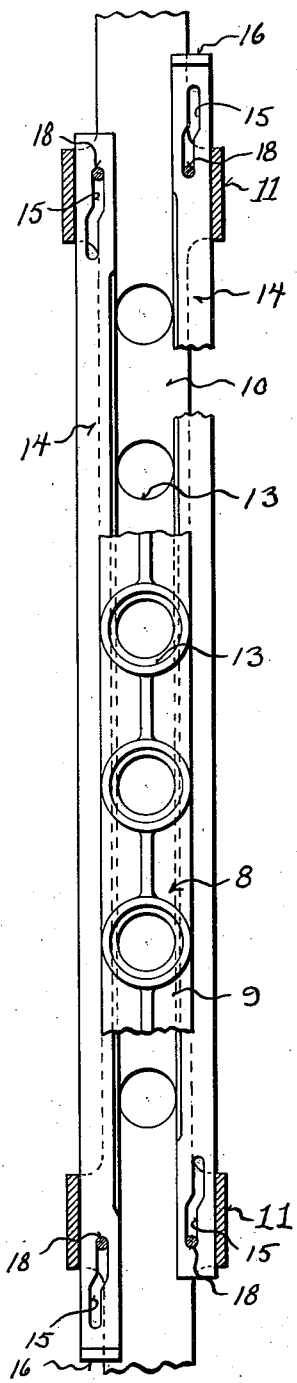
Figure 2 is an enlarged fragmentary plan view of one of the carrier flights partially broken away and in section, the locking mechanism being shown in released position.

Assuming the carrier to be traveling in the direction indicated by the arrow in Figure 1, the cams 20 are designed to engage the fingers 16, causing the locking bars to be laterally projected in relation to each other, and because of the formation of the slots 15, the bars 14 are shifted transversely away from each other, as shown in Figure 2, in which position the openings or recesses 13 are unobstructed permitting the heads of the bottles to freely pass through the same in the loading and unloading operation.

Figure 3:
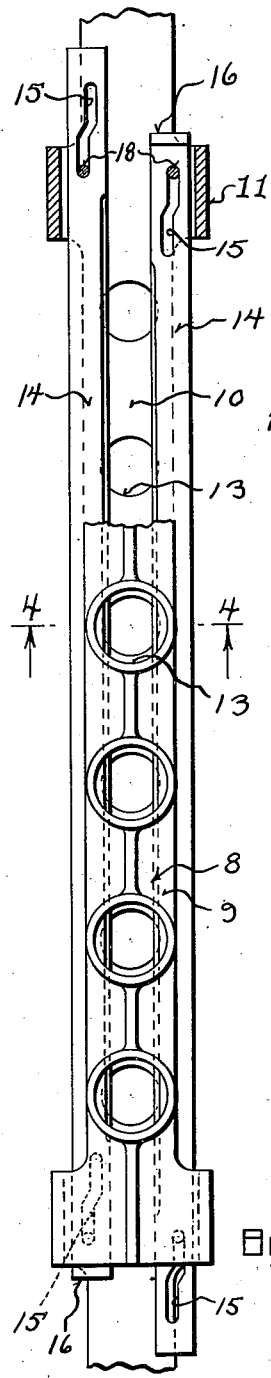
Figure 3 is a similar view showing the locking mechanism in operative position.

As the loaded flights continue their travel, and reach the cams 19, the fingers 16 are engaged by the same, forcing the bars inwardly upon the flights to retracted position as shown in Figure 3, which operation causes the necks of the bottles to be engaged by the opposed edges of the bars 14, as best shown in Figures 3 and 4, thus securely locking the bottles upon the flights both in upright and inverted positions. To provide more effective engagement between the operative edges of the bars 14 and the bottle necks, the same may be slightly beveled to conform to the contour of the necks, as best shown in Figure 4.

Figure 5:
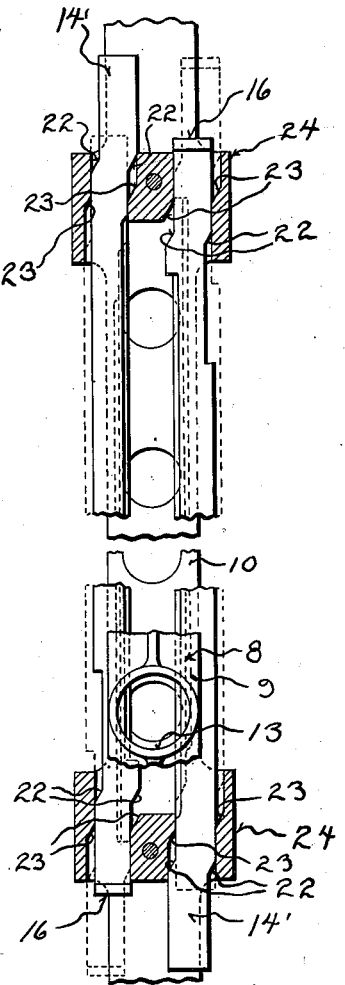
Figure 5 is a fragmentary plan section illustrating a modified form of the invention.
Figure 5:

In the modified form of the invention illustrated in Figure 5, instead of slotting the locking bars to guide and control their movement, they are provided with marginal cam surfaces 22, which cooperate with cam surfaces 23 formed on the spacing webs 24, disposed between the upper and lower sections of the flights, for transversely shifting the bars during their longitudinal reciprocative movement.

In the operation of the present invention, the bottles are removed and inserted in the conveyor at points between the cams 19 and 20, the former serving to shift the bars inwardly on the flights through engagement with the fingers 16, which operation causes the bars to shift transversely toward each other to engage the necks of the bottles adjacent their heads or beads, as may be desired. Inasmuch as the pockets are of sufficient size to permit the heads of the bottles to pass through the flights, in order to aline the bottles for proper engagement by the locking bars, suitable tracks T indicated in dotted lines in Figure 4 are provided below the flights, and definitely spaced therefrom to support the bottles in proper relation to the locking bars.

An important advantage of the present invention results from the fact that the operable edges of the locking bars are straight, thereby eliminating expensive machining operations essential in those structures providing notches or keyhole slots of irregular contour. Furthermore, the locking bars employed can be made from standard strap material. Due to the fact that locking bars are moved longitudinally by the cams 19, and transversely shifted toward each other, the same will first engage any high spot occurring upon the bottle necks, and the bottles will be rotated sufficiently to present a diameter of sufficiently reduced dimension to allow continued longitudinal movement of the bars without damage or mutilation of the bottle neck.

From the foregoing explanation, considered in connection with the accompanying drawings, it will be apparent that an exceedingly simple, and effective locking mechanism has been provided for bottle carriers, which can be produced at a considerable saving over other types of bottle locks, and at the same time retain all of the advantages of the same.

I claim:

1. An endless carrier for bottle washing machines comprising, a plurality of transverse flights, each provided with spaced pockets for receiving the necks of bottles, and means carried by each of said flights for locking engagement of the bottle necks adjacent their heads, said means being bodily shiftable both longitudinally and transversely.

2. An endless carrier for bottle washing machines comprising, a plurality of transverse flights, each provided with spaced pockets for receiving the necks of bottles, means carried by each of said flights for locking engagement of the bottle necks adjacent their heads, said means being bodily shiftable both longitudinally and transversely and means for longitudinally shifting said locking means and transversely moving said locking means during longitudinal shifting of the same.

3. An endless carrier for bottle washing machines comprising, a plurality of transverse flights, each provided with spaced pockets for receiving the necks of bottles, means carried by each of said flights for locking engagement of the bottle necks adjacent their heads, said means being bodily shiftable both longitudinally and transversely, means on the washer for longitudinally shifting said locking means on said flights, and means on the flights for transversely moving said locking means during longitudinal shifting of the same.

4. An endless carrier for bottle washing machines comprising, a plurality of transverse flights, each provided with spaced pockets for receiving the necks of bottles, means carried by each of said flights for locking engagement of the bottle necks adjacent their heads, said means being bodily shiftable both longitudinally and transversely and cams for shifting said locking means both longitudinally and transversely.

5. An endless carrier for bottle washing machines comprising, a plurality of transverse flights, each provided with spaced pockets for receiving the necks of bottles, means carried by each of said flights for locking egagement of the bottle necks adjacent their heads, fixed cams on the washing machine for longitudinally shifting said locking means on the flights, and cooperating cam means on the flights and locking means for imparting transverse movement to the locking means during their longitudinal shifting movement.

6. An endless carrier for bottle washing machines comprising, a plurality of transverse flights, each provided with spaced pockets for receiving the necks of bottles, means carried by each of said flights for locking engagement of the bottle necks adjacent their heads, opposed complementary locking bars carried by each of said flights for locking engagement with the bottle necks adjacent their heads, said locking bars being bodily movable both longitudinally and transversely.

7. An endless carrier for bottle washing machines comprising, a plurality of transverse flights, each provided with spaced pockets for receiving the necks of bottles, means carried by each of said flights for locking engagement of the bottle necks adjacent their heads, and complementary opposed locking bars having straight parallel edges for engagement with the bottle necks adjacent their heads, means for longitudinally shifting said locking bars, and means for imparting trnasverse movement to said locking bars during their longitudinal shifting movement.

8. An endless carrier for bottle washing machines comprising, a plurality of transverse flights, each provided with spaced pockets for receiving the necks of bottles, means carried by each of said flights for locking engagement of the bottle necks adjacent their heads, opposed complementary locking bars having straight parallel operable edges, cams carried by the flights, and cooperating cams interposed between the flights and locking bars for imparting transverse movement to the locking bars during their longitudinal shifting movement.

JOHN R. DOSTAL.